US011400941B2

(12) United States Patent
Ishikawa et al.

(10) Patent No.: US 11,400,941 B2
(45) Date of Patent: Aug. 2, 2022

(54) MOVING BODY BEHAVIOR PREDICTION DEVICE

(71) Applicant: HITACHI AUTOMOTIVE SYSTEMS, LTD., Hitachinaka (JP)

(72) Inventors: Masayoshi Ishikawa, Tokyo (JP); Hiroaki Itou, Tokyo (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 444 days.

(21) Appl. No.: 16/608,583

(22) PCT Filed: May 11, 2018

(86) PCT No.: PCT/JP2018/018261
§ 371 (c)(1),
(2) Date: Oct. 25, 2019

(87) PCT Pub. No.: WO2018/221159
PCT Pub. Date: Dec. 6, 2018

(65) Prior Publication Data
US 2020/0139975 A1  May 7, 2020

(30) Foreign Application Priority Data

Jun. 1, 2017  (JP) .............................. JP2017-108909

(51) Int. Cl.
*B60W 40/04* (2006.01)
*G06N 20/00* (2019.01)
*G06N 5/04* (2006.01)

(52) U.S. Cl.
CPC .............. *B60W 40/04* (2013.01); *G06N 5/04* (2013.01); *G06N 20/00* (2019.01); *B60W 2554/80* (2020.02)

(58) Field of Classification Search
CPC ............. B60W 40/04; B60W 2554/80; B60W 50/0097; B60W 2050/0088;
(Continued)

(56) References Cited

U.S. PATENT DOCUMENTS

| 2018/0074497 | A1* | 3/2018 | Tsuji ...................... G06V 20/59 |
| 2018/0105185 | A1  | 4/2018 | Watanabe |
| 2018/0105186 | A1* | 4/2018 | Motomura ............. G06V 10/82 |

FOREIGN PATENT DOCUMENTS

| JP | 2011-100492 A | 5/2011 |
| JP | 2014-071728 A | 4/2014 |

(Continued)

OTHER PUBLICATIONS

English Translation_EspaceNet_JP2014071728A (Year: 2014).*

(Continued)

*Primary Examiner* — Peter D Nolan
*Assistant Examiner* — Ashley L Redhead, Jr.
(74) *Attorney, Agent, or Firm* — Foley & Lardner LLP

(57) ABSTRACT

A moving body behavior prediction device predicts the behavior of a moving body comprising: a travel environment recognition unit that acquires external information DS and recognizes the travel environment; a prediction model evaluation value storage unit that stores an evaluation value for each travel environment in relation to prediction models prepared in advance; a prediction model determination unit 112 that determines the prediction model corresponding to the travel environment recognized by the travel environment recognition unit from among the prediction models, the determination being performed on the basis of the travel environment recognized by the travel environment recognition unit and the evaluation value stored in the prediction model evaluation value storage unit; and a behavior prediction unit 113 that predicts the behavior of the moving body (Continued)

using the prediction model determined by the prediction model determination unit.

6 Claims, 11 Drawing Sheets

(58) Field of Classification Search
CPC .......... B60W 2552/05; B60W 30/095; B60W 30/0956; G06N 5/04; G06N 20/00; G06N 3/0454; G06N 3/08; G06N 3/0445; G08G 1/16

See application file for complete search history.

(56) References Cited

FOREIGN PATENT DOCUMENTS

| | | | |
|---|---|---|---|
| JP | 2014071728 A | * | 4/2014 |
| JP | 2016-216029 A | | 12/2016 |
| WO | WO-2016/170786 A1 | | 10/2016 |

OTHER PUBLICATIONS

International Search Report with English translation and Written Opinion issued in corresponding application No. PCT/JP2018/018261 dated Sep. 4, 2018.

* cited by examiner

| PREDICTION MODEL EVALUATION VALUE STORAGE UNIT 115 ||||||
| 1151 | 1152(1) | 1152(2) | | 1152(n) |
|---|---|---|---|---|
| TRAVEL ENVIRONMENT | PREDICTION MODEL PM1 | PREDICTION MODEL PM2 | ... | PREDICTION MODEL PMn |
| DE1 | 10 | <u>40</u> | ... | 28 |
| DE2 | <u>20</u> | 18 | ... | 12 |
| ... | ... | ... | ... | ... |
| DEn | 21 | 3 | ... | <u>22</u> |

FIG. 4

| SAFETY MODEL STORAGE UNIT 116 | | | | |
|---|---|---|---|---|
| 1161 | 1162(1) | 1162(2) | | 1162(n) |
| TRAVEL ENVIRONMENT | PREDICTION MODEL PM1 | PREDICTION MODEL PM2 | ... | PREDICTION MODEL PMn |
| DE1 | × | ○ | ... | ○ |
| DE2 | ○ | ○ | ... | × |
| ... | ... | ... | ... | ... |
| DEn | ○ | × | ... | ○ |

FIG. 11

| | SAFETY MODEL EVALUATION 1210 | | | |
|---|---|---|---|---|
| 1211 | 1211(1) | 1211(2) | | 1211(n) |
| TRAVEL ENVIRONMENT | PREDICTION MODEL PM1 | PREDICTION MODEL PM2 | ... | PREDICTION MODEL PMn |
| DE1 | 30 / 70 | 100 / 0 | ... | 100 / 0 |
| DE2 | 100 / 0 | 100 / 0 | ... | 20 / 80 |
| ... | ... | ... | ... | ... |
| DEn | 100 / 0 | 33 / 67 | ... | 100 / 0 |

MOVING BODY BEHAVIOR PREDICTION DEVICE

TECHNICAL FIELD

The present invention relates to a moving body behavior prediction device.

BACKGROUND ART

In recent years, development has been progressed on: a sensing technique for sensing surrounding conditions with an in-vehicle camera or the like; a recognition technique for recognizing a subject vehicle state and a surrounding environment based on sensed data; a control technique for controlling traveling velocity, a steering angle, and the like based on recognized information; and the like.

In the technique for recognizing the subject vehicle state and the surrounding environment, it is required to recognize features and moving bodies existing around the subject vehicle and to accurately predict future positions thereof. However, behaviors of surrounding moving bodies, such as pedestrians and other vehicles, change depending on an environment in which the moving bodies exist. Therefore, there has been proposed a technique, in which a plurality of prediction models to predict a behavior of a moving body are provided and an appropriate model is selected according to a surrounding environment (PTL 1). In PTL 1, a prediction model of a movement region is switched according to a behavior of an object vehicle.

CITATION LIST

Patent Literature

PTL 1: JP 2011-100492 A

SUMMARY OF INVENTION

Technical Problem

A behavior (locus) of a moving body, such as a vehicle, a pedestrian, and a motorcycle, is affected by various factors including: surrounding features, such as undulations on roads and traffic signals, and conditions thereof; and direct or indirect interaction with other moving bodies. Furthermore, trajectories that need to be predicted differ depending on a type of the moving body such as a vehicle and a pedestrian, and have a variety of choices. However, it is difficult to determine appropriate prediction models for all travel environments before shipping a moving body behavior prediction device, due to the comprehensiveness of verification and a difference between an actual travel environment and a test environment.

In addition, there is a possibility that a subject vehicle exhibits an unsafe behavior if a prediction model inappropriate for the surrounding environment is selected when evaluating each prediction model in the actual travel environment. PTL 1 shows consideration on the behavior of the single vehicle as a target, but the prediction model is not changed according to the surrounding environment or other moving bodies. Furthermore, there is no statement regarding a change of a method of selecting the prediction model set before shipment in PTL 1.

The present invention has been made in view of the above problems, and an object thereof is to provide a moving body behavior prediction device capable of predicting a behavior of a moving body using a prediction model corresponding to a travel environment.

Solution to Problem

In order to solve the above problems, a moving body behavior prediction device according to one aspect of the present invention is a moving body behavior prediction device that predicts a behavior of a moving body and includes: a travel environment recognition unit that acquires external information and recognizes a travel environment; a prediction model evaluation value storage unit that stores an evaluation value for each travel environment in relation to each of prediction models prepared in advance; a prediction model determination unit that determines the prediction model corresponding to the travel environment recognized by the travel environment recognition unit from among the prediction models, the determination being performed based on the travel environment recognized by the travel environment recognition unit and the evaluation value stored in the prediction model evaluation value storage unit; and a behavior prediction unit that predicts the behavior of the moving body using the prediction model determined by the prediction model determination unit.

Advantageous Effects of Invention

According to the present invention, it is possible to predict the behavior of the moving body using the prediction model corresponding to the travel environment.

BRIEF DESCRIPTION OF DRAWINGS

FIG. 4 is an explanatory view illustrating a configuration example of a safety model storage unit.

FIG. 11 is an explanatory view illustrating a configuration example of a safety model evaluation unit.

DESCRIPTION OF EMBODIMENTS

Hereinafter, embodiments of the present invention will be described in detail based on the drawings. In the present embodiment, each prediction model is evaluated for each travel environment, and a behavior of a moving body is appropriately predicted using a prediction model corresponding to each travel environment as will be described later.

In the present embodiment, one prediction model is selected, from among prediction models evaluated to be safe for each travel environment, and used. In the present embodiment, when it is possible to estimate that the predetermined safe state is maintained, one prediction model is selected from among the prediction models (safety models) evaluated to be safe. On the other hand, when it is estimated that the predetermined safe state is not maintained, one prediction model having the highest evaluation value (with the best evaluation) is selected for the travel environment in the present embodiment.

First Embodiment

Figure 1:
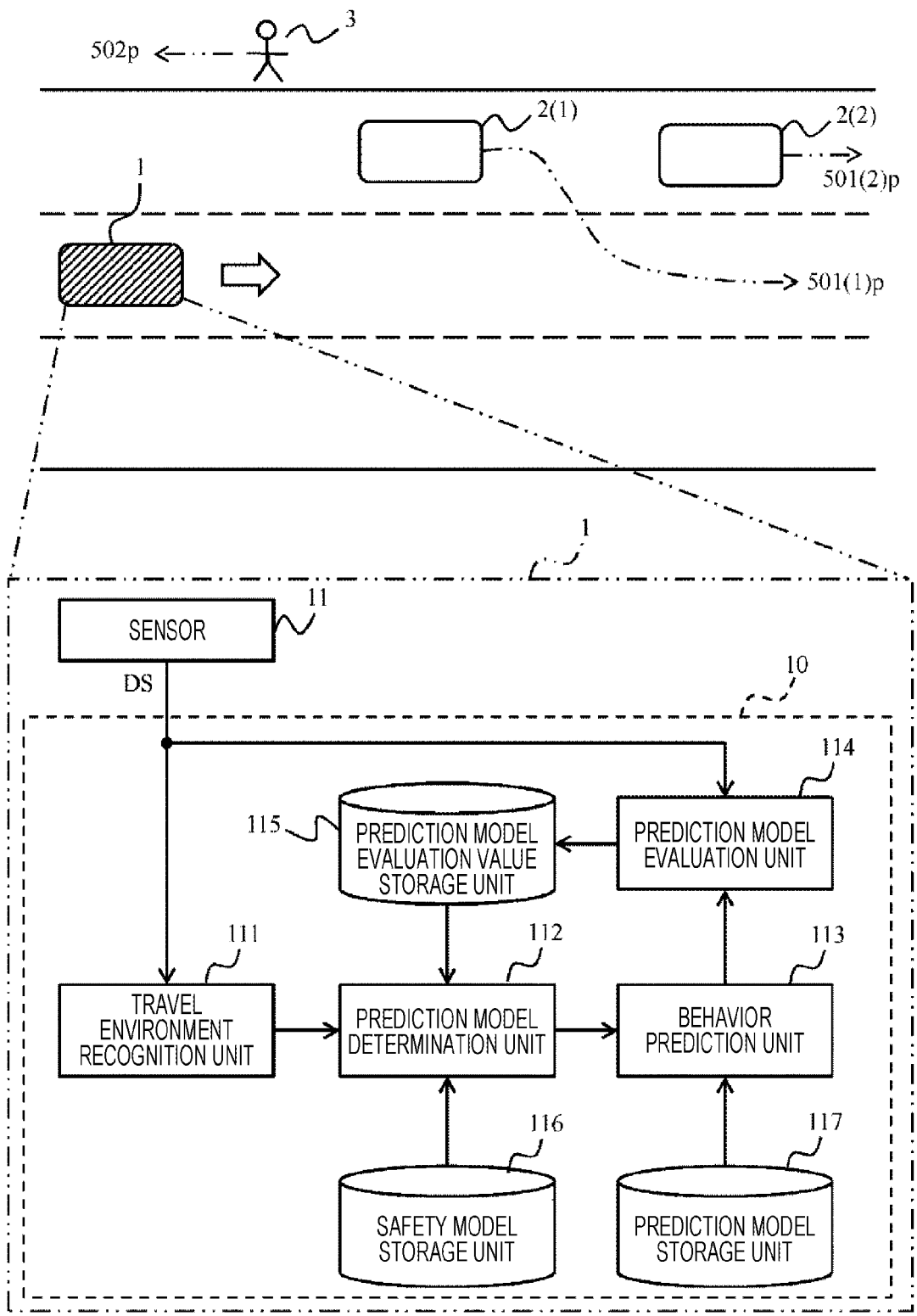
FIG. 1 is an explanatory view of a moving body behavior prediction device.

A first embodiment will be described with reference to FIGS. 1 to 9. FIG. 1 illustrates a prediction example of a behavior of a moving body and a configuration example of a moving body behavior prediction device 10.

A subject vehicle 1, other vehicles 2(1) and 2(2) and a pedestrian 3 are illustrated on the upper side of FIG. 1. The other vehicles 2(1) and 2(2) will be referred to as the other vehicle 2 unless particularly distinguished. The other vehicle 2 and the pedestrian 3 are examples of the "moving body". The vehicles 1 and 2 include a passenger car, a truck, a bus, a motorcycle, a bicycle, and the like.

The moving body behavior prediction device 10 according to the present embodiment is provided in the subject vehicle 1. As will be described later, it is not necessary to provide all the configurations of the moving body behavior prediction device 10 in the subject vehicle 1, and at least some of the configurations may be provided in a management server 7 (see FIG. 12) to be described later that exists outside the subject vehicle 1.

The moving body behavior prediction device 10 is realized as a microprocessor (not illustrated) reads and executes a predetermined computer program stored in a memory in an electronic control unit (ECU) (not illustrated).

First, an overview of prediction of a behavior of a moving body will be described. The moving body behavior prediction device 10 predicts a future position of each moving body existing around the subject vehicle 1 such as the other vehicle 2 and the pedestrian 3. A result of the prediction is indicated by the two-dot chain line on the upper side of FIG. 1. The other vehicle 2(1) is predicted to move as a locus 501(1)$p$. Similarly, the other vehicle 2(2) is predicted to move as a locus 501(2)$p$. The pedestrian 3 is predicted to move along a locus 502$p$.

The moving body such as the other vehicle 2 and the pedestrian 3 changes its behavior according to the surrounding environment (travel environment) thereof. A driving behavior of a vehicle also changes between different types of roads, for example, between an expressway and a national road, between a national road and a back road, and the like. The behavior of the moving body also changes depending on how many other moving bodies exist in the surroundings. For example, a behavior of a vehicle changes significantly between an expressway where there is no other moving body in the surroundings and an expressway in a traffic jam, a shopping street with lots of people, or the like Therefore, it is necessary to appropriately select a prediction model to predict a future locus of a moving body and to perform the behavior prediction with high accuracy depending on a travel environment, such as traveling road information and the number of surrounding objects, in order to realize safe driving and automatic driving.

However, it is difficult to determine appropriate prediction models for all travel environments in which the subject vehicle 1 is likely to travel before shipping the moving body behavior prediction device 10 when considering the comprehensiveness of verification and a difference between an actual travel environment and a test environment.

Thus, it is necessary to select an appropriate prediction model for each travel environment by evaluating which prediction model in which travel environment enables safe control of the subject vehicle 1 while traveling in the actual travel environment.

A point that needs to be considered herein is that there is a possibility that the subject vehicle 1 exhibits an unsafe behavior if a prediction model inappropriate for the surrounding environment is selected when evaluating each prediction model in the actual travel environment. That is, when it is desired to evaluate all the prediction models during actual travel, there is a risk that an inappropriate prediction model may be selected.

Therefore, the prediction model which can be used is determined in advance for each travel environment as will be described later. It is possible to evaluate any travel environment where each prediction model can be used periodically using, for example, past sensor data as will be described later.

In the present embodiment, prediction models with which the subject vehicle 1 is estimated to be less likely to exhibit an unsafe behavior are prepared in advance for each of travel environments and stored as safety models. A prediction model to be evaluated is selected, from among the safety models prepared in advance, when evaluating each prediction model during actual travel of the subject vehicle 1. As a result, each prediction model can be safely evaluated under the actual travel environment, and an appropriate prediction model can be selected for each travel environment based on the evaluation result (evaluation value) in the present embodiment.

A configuration example of the moving body behavior prediction device 10 will be described with reference to the lower side of FIG. 1. The moving body behavior prediction device 10 includes, for example, a travel environment recognition unit 111, a prediction model determination unit 112, a behavior prediction unit 113, a prediction model evaluation unit 114, a prediction model evaluation value storage unit 115, a safety model storage unit 116, and a prediction model storage unit 117.

The subject vehicle 1 include a plurality of sensors 11. Examples of the sensors 11 include a camera, a radar, light detection and ranging (LIDAR), a sonar, a global positioning system (GPS), and a car navigation system which are attached to the subject vehicle 1. Sensor data DS, which is an example of "external information" can include data from the sensor 11 and a result of processing on the data obtained from the sensor 11. Examples of the sensor data DS can include a recognition result of an object, such as the other vehicle 2 and the pedestrian 3, existing around the subject vehicle 1, map data, road attribute information, destination information, and the like. Furthermore, the sensor data DS also includes information required for prediction by a prediction model to be used for behavior prediction.

The travel environment recognition unit 111 recognizes a travel environment around the subject vehicle 1 using the sensor data DS. Here, the travel environment is an environment during travel of the subject vehicle 1 determined by, for example, road information, a subject vehicle travel plan, the number of pedestrians in the surroundings, the number of other vehicles in the surroundings, and the like.

The road information is, for example, a type of a road on which the subject vehicle 1 travels, such as an expressway, a main road, and a back road. The subject vehicle travel plan is, for example, information on a travel plan of the subject vehicle 1 such as whether the subject vehicle 1 proceeds straight on a traveling road or turns right or left. The number of pedestrians in the surroundings is information on the number of pedestrians existing around the subject vehicle 1. The number of other vehicles in the surroundings is information on the number of the other vehicles 2 existing around the subject vehicle 1.

The road information can be obtained by collating position data of the subject vehicle 1 obtained by the GPS with the map data. The subject vehicle travel plan can be obtained from guidance information of a car navigation device. The number of pedestrians in the surroundings and the number of other vehicles in the surroundings can be obtained from recognition results of the camera, the radar, the LIDAR, the sonar, and the like.

The travel environment is determined by combining information such as the road information, the subject vehicle travel plan, the number of pedestrians in the surroundings, and the number of other vehicles in the surroundings, for example, "there are zero pedestrian and a plurality of the other vehicles 2 in the surroundings when turning right on the main road".

The above-described road information, subject vehicle travel plan, number of surrounding pedestrians, number of other surrounding vehicles are examples, and combinations of different values may be used, and information other than the above-described information may be used for recognition of the travel environment. For example, it is possible to consider not only the number of pedestrians or other vehicles existing around the subject vehicle 1 but also relative distances thereof from the subject vehicle 1. This is because it is necessary to pay more attention to an object closer to the subject vehicle 1.

The prediction model determination unit 112 determines a prediction model to be used by the behavior prediction unit 113 in accordance with the travel environment recognized by the travel environment recognition unit 111. The prediction model determination unit 112 uses the recognized travel environment, information of the travel environment-specific prediction model evaluation value storage unit 115, and information of the safety model storage unit 116 to determine a prediction mode by a method to be described later. The prediction model determination unit 112 determines the prediction model to be used by the behavior prediction unit 113 whenever the travel environment recognized by the travel environment recognition unit 111 changes.

The prediction model determination unit 112 selects a prediction model from among the safety models that are less likely to cause an unsafe behavior of the subject vehicle 1. As a result, the moving body behavior prediction device 10 can safely evaluate each prediction model even in the actual travel environment. Furthermore, since the moving body behavior prediction device 10 can evaluate the prediction model for each travel environment, it is possible to select an appropriate prediction model according to the travel environment. As a result, the moving body behavior prediction device 10 can accurately predict the behavior of the moving body.

Figures 2, 3:
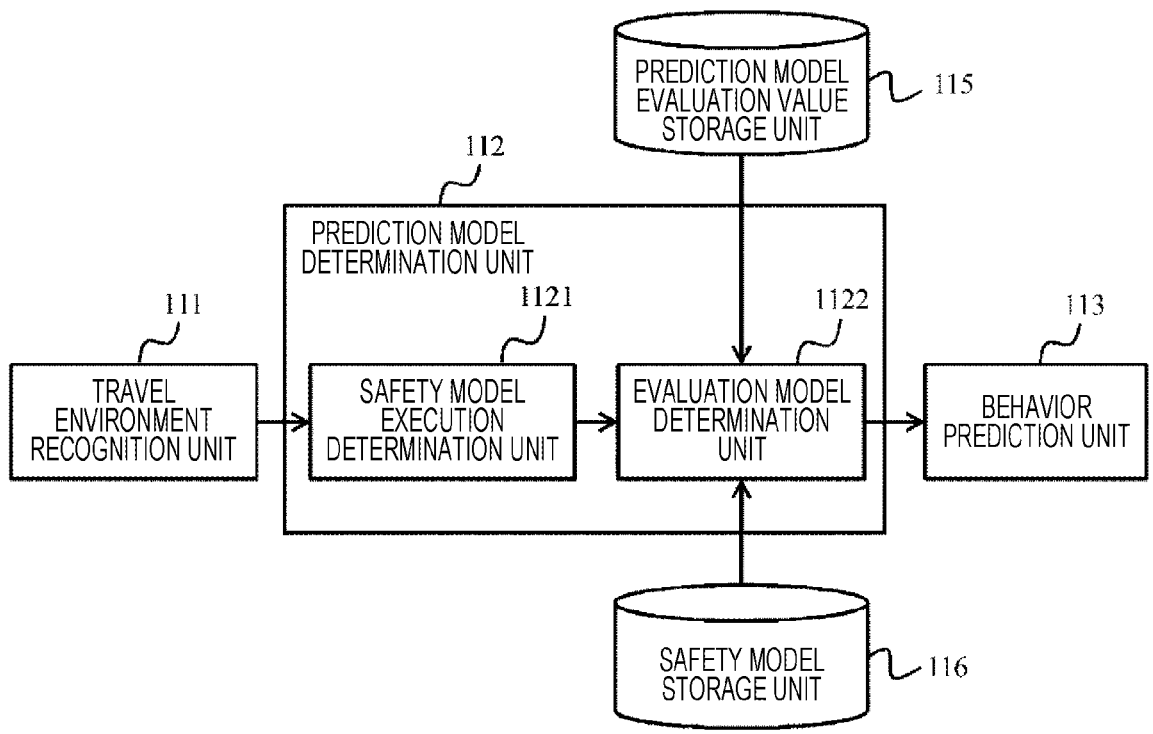
FIG. 2 is a block diagram of a prediction model determination unit.
FIG. 3 is an explanatory view illustrating a configuration example of a prediction model evaluation value storage unit.

Details of the prediction model determination unit 112 will be described with reference to FIG. 2. FIG. 2 is a block diagram mainly illustrating the prediction model determination unit 112. The prediction model determination unit 112 can include, for example, a safety model execution determination unit 1121 and an evaluation model determination unit 1122.

The safety model execution determination unit 1121 determines whether a safety model can be evaluated based on a traffic condition around the subject vehicle 1. That is, when it is possible to estimate that a predetermined safe state set in advance is maintained, the safety model execution determination unit 1121 determines that prediction using each prediction model registered as the safety model may be executed. When it is estimated that the predetermined safe state is not maintained, the safety model execution determination unit 1121 determines that it is difficult to use the safety model for behavior prediction.

The safety model execution determination unit 1121 speculates that it is possible to stop without any contact even if the prediction fails, for example, when a relative distance between a surrounding moving body and the subject vehicle 1 is equal to or longer than a predetermined value (relative distance $RD \geq Th1$) and when a ratio of the relative distance between the subject vehicle 1 and the moving body 2 and relative velocity is equal to or higher than a certain value (relative distance RD/relative velocity $RV \leq Th2$). Such a case corresponds to the case where the predetermined safe state is maintained. When the predetermined safe state is maintained, the safety model execution determination unit 1121 determines that a prediction model can be selected, from among the prediction models registered as the safety models, and evaluated.

The evaluation model determination unit 1122 determines a prediction model to be used to predict a future behavior of a moving body such as the other vehicle or the like. The evaluation model determination unit 1122 determines one prediction model from any one of the prediction model based on the evaluation value stored in the prediction model evaluation value storage unit 115 or the prediction model registered as the safety model in the safety model storage unit 116 according to the determination result of the safety model execution determination unit 1121.

That is, when the safety model execution determination unit 1121 speculates that it is difficult to stop without any contact when the prediction fails and determines that it is difficult to evaluate the safety model, the evaluation model determination unit 1122 selects a prediction model, which is appropriate in a current travel environment from the travel environment-specific prediction model evaluation value storage unit 115, as the prediction model to be used for prediction of the future behavior of the moving body.

On the contrary, when the safety model execution determination unit 1121 speculates that it is possible to stop without any contact even if the prediction fails and determines that it is possible to evaluate the safety model, the evaluation model determination unit 1122 randomly determines one prediction model from among safe prediction models corresponding to the current travel environment stored in the safety model storage unit 116 as the prediction model to be used for prediction of the future behavior of the moving body.

The evaluation model determination unit 1122 transmits information specifying the determined prediction model to the behavior prediction unit 113.

The travel environment-specific prediction model evaluation value storage unit 115 as an example of the "prediction model evaluation value storage unit" stores evaluation values of the respective prediction models evaluated for each of the travel environments.

An example of the travel environment-specific prediction model evaluation value storage unit 115 will be described with reference to FIG. 3. Hereinafter, the travel environment-specific prediction model evaluation value storage unit 115 will be sometimes referred to as the prediction model evaluation value storage unit 115. As illustrated in FIG. 3, the prediction model evaluation value storage unit 115 has a table in which each of prediction models 1152(1) to 1152(n) is associated with each travel environment 1151. The prediction model evaluation value storage unit 115 stores an evaluation value of each prediction model in each travel environment.

When the evaluation model determination unit 1122 determines that it is difficult to evaluate the safety model, the safety model execution determination unit 1121 selects a prediction model having the highest evaluation value in the current travel environment as the prediction model appropriate for the current travel environment. For example, in a travel environment DE1 illustrated in FIG. 3, a prediction model PM2 has a higher evaluation value than the other prediction models. For this reason, the prediction model PM2 is selected as the appropriate prediction model in the travel environment DE1.

An example of the safety model storage unit 116 will be described with reference to FIG. 4. The safety model storage unit 116 has a table in which each of prediction models 1162(1) to 1162 (n) is associated with each travel environment 1161. The safety model storage unit 116 stores whether evaluation possibility of each prediction model in each travel environment. The evaluation possibility is whether or not evaluation using a prediction model in a current travel environment is permitted. In FIG. 4, a state where the evaluation is permitted is indicated by a circle, and a state where the evaluation is prohibited is indicated by a cross.

When the safety model execution determination unit 1121 determines that it is possible to evaluate the safety model, the evaluation model determination unit 1122 randomly determines one from among the respective prediction models that can be evaluated in the current travel environment. In the present embodiment, an evaluation value of each prediction model is updated as needed during travel by randomly selecting a prediction model that has been evaluated to be safe under a safe travel environment. Incidentally, safe prediction models can be selected in order without being limited to the random selection.

When focusing on the example in FIG. 4, the prediction model PM1 is not evaluated not as a safe model, and the prediction model PM2 and a prediction model PMn are evaluated as safe models in the travel environment DE1. In the travel environment DE1, the prediction model PM1 is not selected. The evaluation model determination unit 1122 determines one of the prediction model PM2 and the prediction model PMn as the prediction model to be used by the behavior prediction unit 113.

The behavior prediction unit 113 reads details of the prediction model determined by the prediction model determination unit 112 from the prediction model storage unit 117, and uses the read prediction model to predict a future behavior of a moving body existing around the subject vehicle 1.

Here, the prediction model storage unit 117 stores, for example, information such as a method of calculating the prediction models PM1 to PMn and parameters. As the prediction model, for example, a linear predictor, a potential method, a predictor by machine learning, or the like can be considered. In the present embodiment, machine learning, for example, a prediction model using a predictor based on a neural network will be described as an example.

Figure 5:
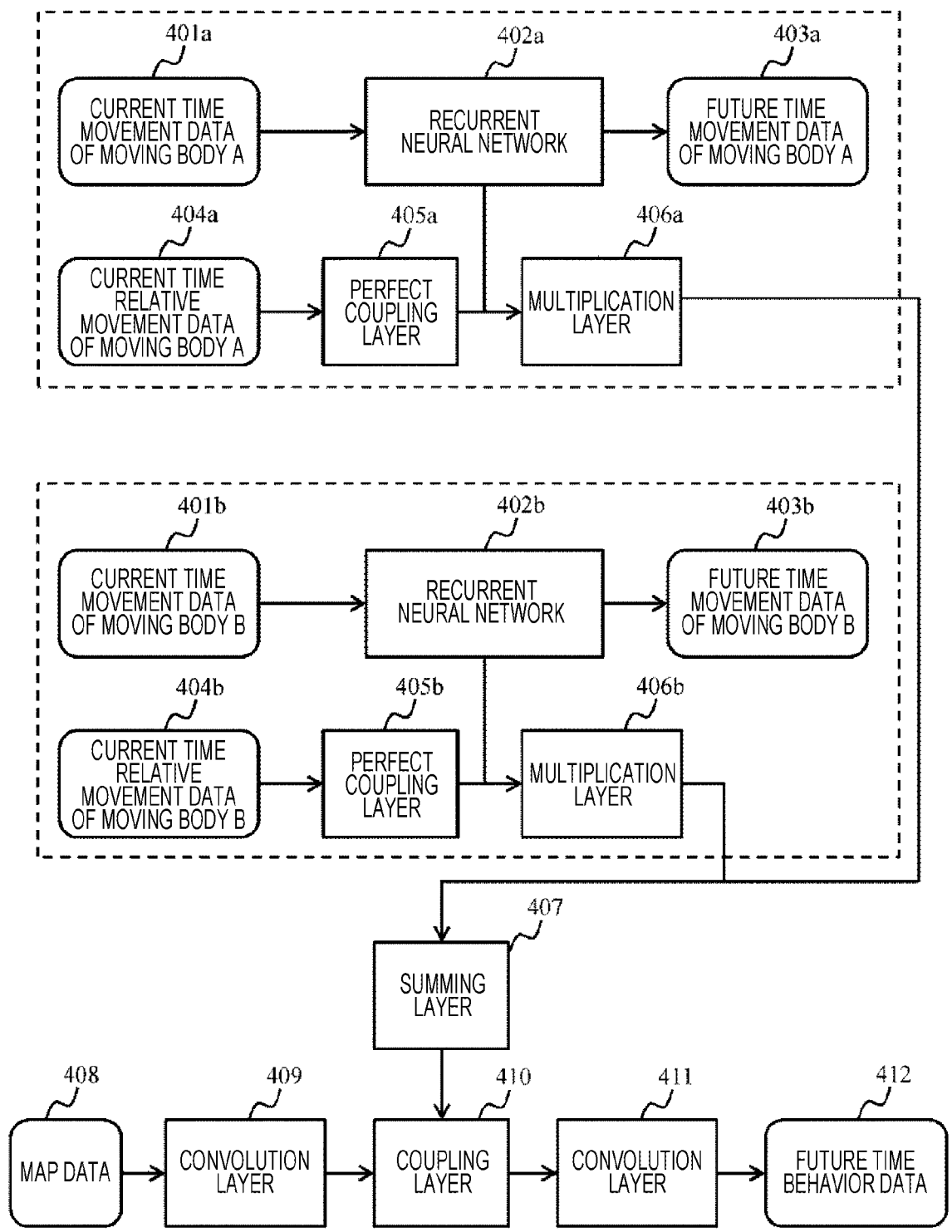
FIG. 5 is a block diagram of a prediction model based on a neural network.

FIG. 5 illustrates details of the prediction model based on the neural network. This prediction model predicts a position using a recurrent neural network for each surrounding moving body, aggregates intermediate states of the recurrent neural networks of the respective moving bodies to be combined with surrounding road conditions and traffic conditions, and predicts a behavior in consideration of the interaction between the respective moving bodies and road information by a convolutional neural network.

Current time movement data 401a of a moving body A and current time movement data 401b of a moving body B are the amount of movement of each of the moving bodies from one cycle ago. The movement amount is a value indicating how much each moving body has moved. Recurrent neural networks 402a and 402b receive current time movement data 401a and 401b of the respective moving bodies as inputs, and output future time movement data 403a of the moving body A and future time movement data 403b of the moving body B which are movement data at the future time of the respective moving bodies.

The recurrent neural network may be a normal recurrent neural network or a derivative system of the recurrent neural network such as a gated recurrent unit (GRU) and long-short term memory (LSTM).

Each of the future time movement data 403a and 403b of the moving bodies is data indicating how much each moving body moves by each time t0, t1, . . . , and tT. The current time movement data 401a and 401b and the future time movement data 403a and 403b are calculated in a coordinate system using a position of each moving body at the current time as a reference.

Here, the future time movement data 403a and 403b output from the recurrent neural networks 402a and 402b are data that predict any direction in which each moving body is likely to move, and are not prediction information with favorable accuracy. For this reason, the future time movement data 403a and 403b are not used as results of behavior prediction.

However, when learning the neural network, the movement amount at each future time t0, t1, . . . , and tT of each moving body is given as teacher information based on the future time movement data 403a and 403b of the respective moving bodies so as to use the data to learn the recurrent neural network more easily.

The current time relative position data 404a of the moving body A and the current time relative position data 404b of the moving body B indicate relative positions of the respective moving bodies in the coordinate system having a position of the subject vehicle 1 at the current time as the center. Perfect coupling layers 405a and 405b receive the current time relative position data 404a and 404b of the respective moving bodies as inputs, and output results obtained by applying affine transformation and an activation function.

The outputs of the full coupling layers 405a and 405b have the same dimensions as internal states of the recurrent neural networks 402a and 402b. Multiplication layers 406a and 406b output products of the internal states of the recurrent neural networks 402a and 402b and elements of the outputs of the perfect coupling layers 405a and 405b, respectively.

The summing layer 407 calculates a sum of the outputs of the multiplication layers 406a and 406b of the respective moving bodies. The movement amount of each moving body at the future time predicted by each of the recurrent neural networks 402a and 402b is indicated in a coordinate system having the current time of each moving body as the center. Thus, a relative movement amount with respect to the subject vehicle 1 is calculated by taking a product for each element of values obtained by processing the relative position of each moving body from the subject vehicle 1 in the perfect coupling layers 405a and 405b.

The summing layer 407 calculates the sum of values of the multiplication layers 406a and 406b of the respective moving bodies. As a result, it is possible to grasp any relative position from the subject vehicle where a moving body is present and any direction in which the moving body is going to move.

After the summing layer 407 acquires the sum of the outputs of the multiplication layers 406a and 406b of all recognized moving bodies, prediction in consideration of the interaction between the respective moving bodies and road information is performed based on the convolutional neural network. Map data 408 is data in which road information around the subject vehicle is stored. An overview of the map data 408 will be described later with reference to FIG. 6. A convolution layer 409 applies the convolutional neural network to the map data 408.

A coupling layer 410 couples an output of convolution layer 409 and the output of summing layer 407. The coupling of the respective outputs is performed by, for example, adding the output of the summing layer 407 in a channel direction of the output result of the convolution layer 409 after matching the width and height of the convolution layer 409.

Another neural network such as a convolution layer may be added between the summing layer 407 and the coupling layer 410. A convolution layer 411 applies the convolutional neural network to the output of the summing layer 407 and the convolution layer 409 coupled by the coupling layer 410 to output future time behavior data 412. The future time behavior data 412 represents a probability that a moving body exists at each coordinate at each future time t0, t1, ..., and tT on a coordinate system having the subject vehicle 1 as the center.

The convolution layers 409 and 411 are not necessarily the single layer and may include a plurality of layers, and each intermediate state, the width and height of the output may remain constant and may be reduced or enlarged through the map data 408, the convolution layer 409, the coupling layer 410, the convolution layer 411, and the future time behavior data 412.

Although the example in which the two moving bodies A and B exist has been described in FIG. 5, in practice, the number of moving bodies is not limited to two, and may be one or more. For example, when there is a third moving body C (not illustrated), the current time movement data 401a and 401b of the respective moving bodies, the recurrent neural networks 402a and 402b, the future time movement data 403a and 403b of the respective moving bodies, the current time relative position data 404a and 404b of the respective moving bodies, the perfect coupling layers 405a and 405b, and the multiplication layers 406a and 406b are calculated even for the moving body C. The summing layer 407 calculates and outputs a sum of an output of a multiplication layer relating to the moving body C, the output of the multiplication layer 406a relating to the moving body A, and the output of the multiplication layer 406b relating to the moving body B. In this manner, it is possible to predict future behaviors for the plurality of moving bodies.

Figure 6:
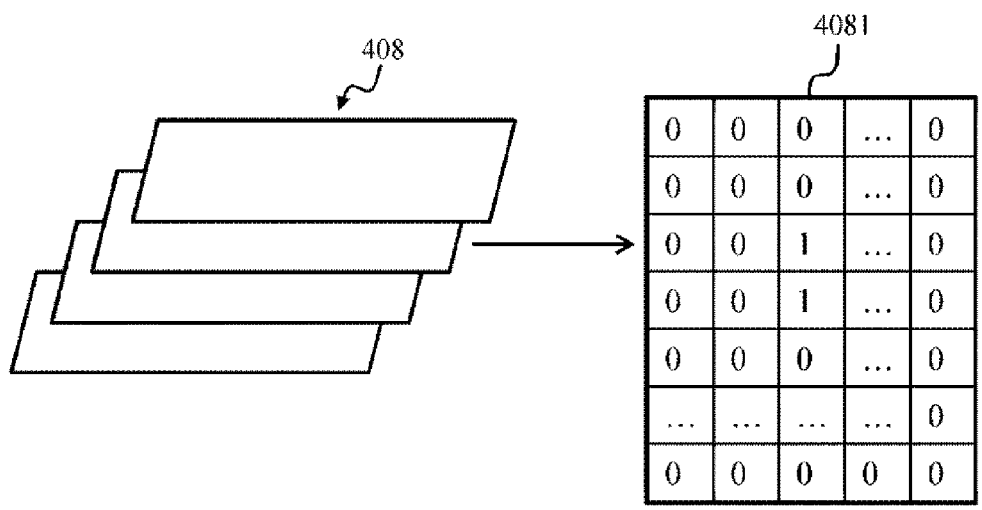
FIG. 6 is a schematic view of map data.

FIG. 6 illustrates an overview of the map data 408. The map data 408 is constituted by a plurality of pieces of layer information 4081. The layer information 4081 is data in which information around the subject vehicle 1 is organized for each position information. The layer information 4081 is information obtained by cutting out a region around the subject vehicle 1 and dividing the region by a grid. Each square of the layer information 4081 corresponds to actual position information, and information corresponding to the position information of each square is stored. For example, in the case of information expressed by one-dimensional binary values such as road information, one is stored in a square corresponding to position information on a road, and zero is stored in a square corresponding to position information other than the road. In the case of information expressed by two-dimensional continuous values such as velocity information, the layer information is divided into two layers, and a direction 1 velocity component and a direction 2 velocity component are stored. Here, the direction 1 and the direction 2 are, for example, a progressing direction and a lateral direction of a vehicle, or the north direction and the east direction. When the velocity information is converted into the layer information, the information is stored in a square corresponding to position information of the subject vehicle 1 or a moving body.

In this manner, the layer information 4081 is the information stored in the square corresponding to the position information of the acquired information over layers equal to or smaller than the number of dimensions of the acquired information, for environmental information, moving body information, and subject vehicle information.

If the acquired information relates to information that exists only at a specific position, such as a falling object and a moving body, the information is stored in a square of the corresponding position information. The map data 408 is configured by stacking the respective pieces of the layer information 4081 generated in this manner. When stacking pieces of the layer information 4081, pieces of position information of squares of the respective layers are made to match each other. Incidentally, it is assumed that the data used by the behavior prediction unit 113 is included in the sensor data DS.

The prediction model evaluation unit 114 evaluates the prediction result of the behavior prediction unit 113 for the prediction model determined by the prediction model determination unit 112. The subject vehicle 1 is controlled such that the subject vehicle 1 does not come into contact with another moving body nor an obstacle based on the behavior prediction of each moving body output from the behavior prediction unit 113.

The prediction model evaluation unit 114 determines as an "operation success" if a predetermined behavior, such as contact, sudden braking, and sudden steering, does not occur as a result of control of the subject vehicle according to the output of the behavior prediction unit 113. On the other hand, when the predetermined behavior such as contact, sudden braking, and sudden steering occurs, the prediction model evaluation unit 114 evaluates as an "operation failure". The prediction model evaluation unit 14 determines whether the operation based on the prediction model has succeeded or failed based on the sensor data DS.

Figure 7:
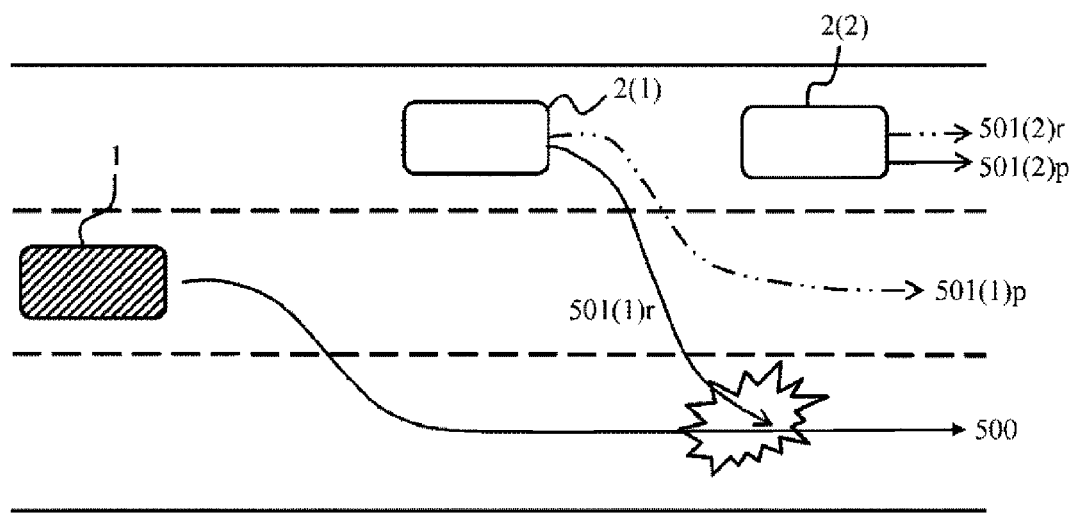
FIG. 7 is an explanatory view illustrating a method of evaluating a success or a failure of prediction.

FIG. 7 illustrates an overview of the evaluation on the operation success/failure performed by the prediction model evaluation unit 114. The case where the other vehicles 2(1) and 2(2) exist around the subject vehicle 1 will be described similarly to FIG. 1.

The behavior prediction unit 113 predicts behaviors of the other vehicles 2(1) and 2(2). The predicted behaviors for the respective other vehicles 2(1) and 2(2) output from the behavior prediction unit 113 are indicated by two-dot chain lines 501(1)$p$ and 501(2)$p$.

A trajectory, planned not to cause contact, sudden braking, nor sudden steering with respect to such predictions 501(1)$p$ and 501(2)$p$, is set as a planned trajectory 500. Behaviors actually taken by the other vehicles 2(1) and 2(2) are indicated by solid lines 501(1)$r$ and 501(2)$r$.

In the example of FIG. 7, the actual trajectory 501(1)$r$ of the other vehicle 2(1) is different from the predicted behavior 501(1)$p$, and intersects with the planned trajectory 500 of the subject vehicle 1. As a result, when contact, sudden braking, or sudden steering, occurs, it is evaluated as the "operation failure". On the other hand, it is evaluated as the "operation success" when no contact, sudden braking, nor sudden steering occurs due to the actual trajectory of another vehicle. The prediction model evaluation unit 114 updates the evaluation value of the travel environment-specific prediction model evaluation value storage unit 115 based on its own evaluation result.

Figure 8:
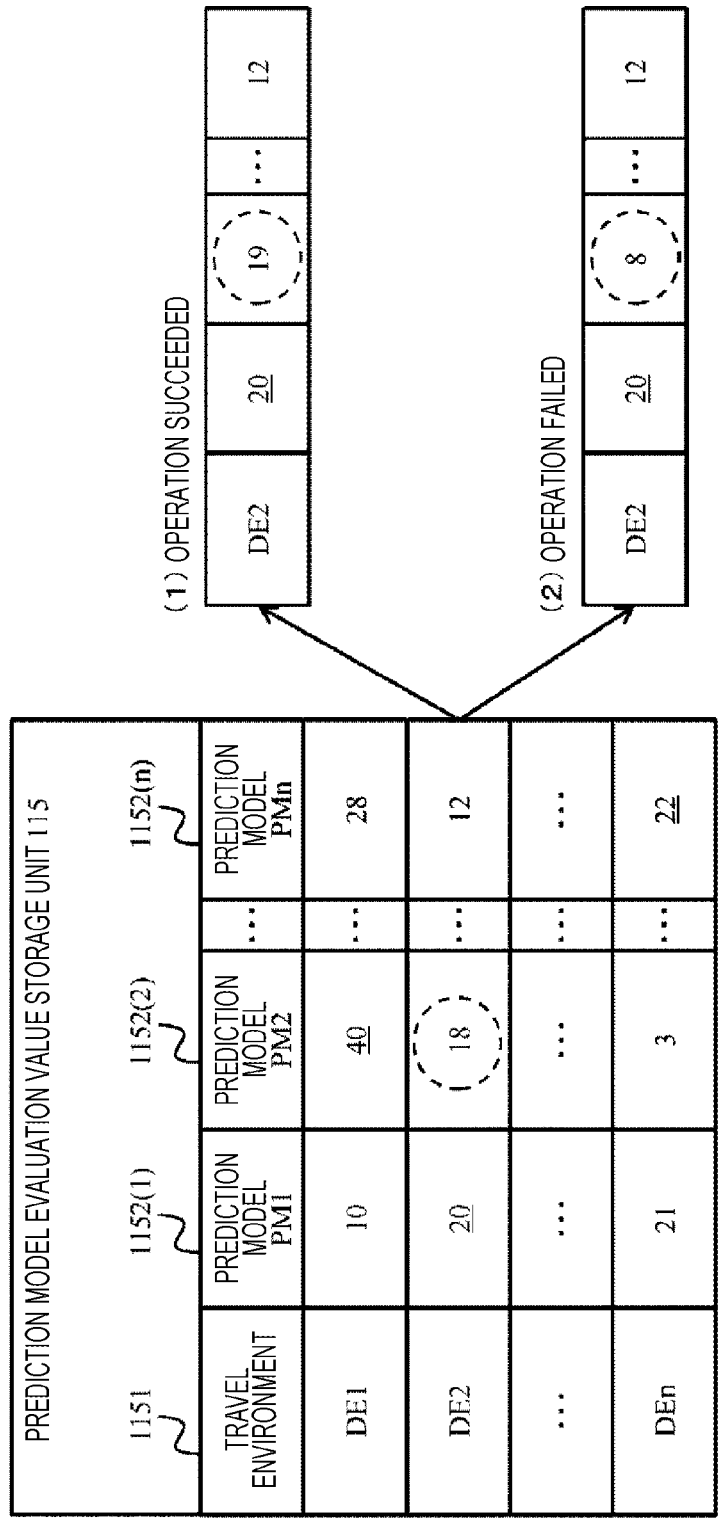
FIG. 8 illustrates evaluation values stored in the prediction model evaluation value storage unit.

Details of the update of the travel environment-specific prediction model evaluation value storage unit 115 by the prediction model evaluation unit 114 will be described with reference to FIG. 8. Here, a description will be given by exemplifying a case where the travel environment recognized by the travel environment recognition unit 111 is a travel environment DE2 and the prediction model determined by the prediction model determination unit 112 is the prediction model PM2.

When the prediction model evaluation unit 114 evaluates as the "operation success", a point is added to a value of the prediction model PM2 determined by the prediction model determination unit 112 in the travel environment DE2 recognized by the travel environment recognition unit 111. An evaluation value to which a point is added is indicated by the dotted circle. In FIG. 8, an original evaluation value of the prediction model PM2 in the travel environment DE2 is "18" and is increased to "19" since the behavior prediction using the prediction model PM2 has succeeded.

On the other hand, when the prediction model evaluation unit 114 evaluates as the "operation failure", the value of the prediction model PM2 determined by the prediction model determination unit 112 in the travel environment DE2 recognized by the travel environment recognition unit 111 is detected to "8".

Figure 9:
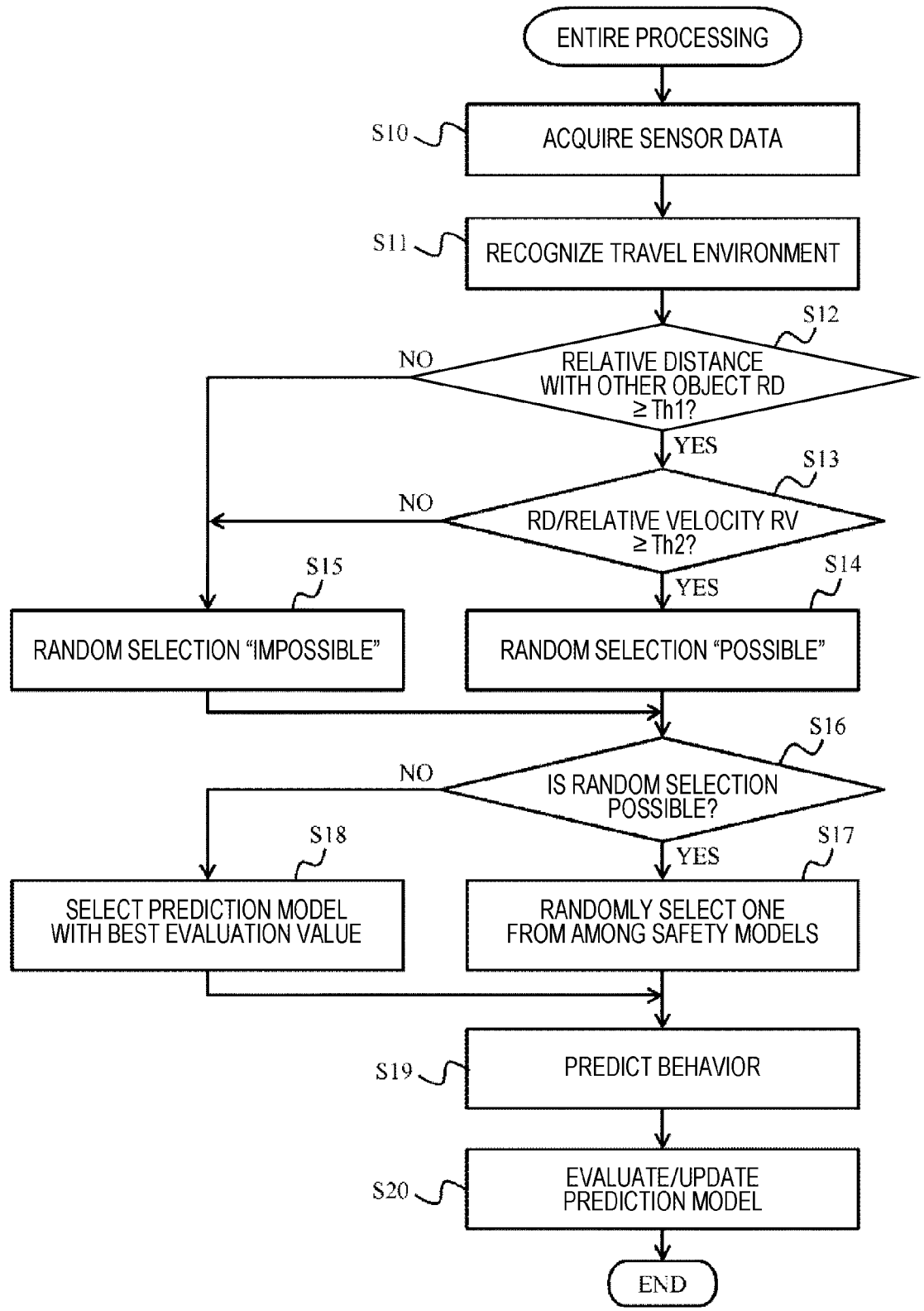
FIG. 9 is a flowchart illustrating an overall operation of the moving body behavior prediction device.

FIG. 9 is a flowchart illustrating an overall operation of the moving body behavior prediction device 10. The travel environment recognition unit 111 of the moving body behavior prediction device 10 acquires the sensor data DS from the sensor 11 (S10), and recognizes the travel environment of the subject vehicle 1 based on the sensor data DS (S11).

The safety model execution determination unit 1121 of the prediction model determination unit 112 determines whether the relative distance RD with respect to the other object (moving body 2) in the surroundings is equal to or longer than a predetermined threshold Th1 (S12). When the relative distance RD with respect to the other object is equal to or longer than the predetermined threshold Th1 (S12: YES), the safety model execution determination unit 1121 determines whether a value obtained by dividing the relative distance RD by the relative velocity RV is equal to or higher than a predetermined threshold Th2 (S13). The relative velocity RV is the relative velocity between the subject vehicle 1 and the other object. When the value obtained by dividing the relative distance RD by the relative velocity RV is equal to or higher than the threshold Th2 (S13: YES), the safety model execution determination unit 1121 estimates that the predetermined safe state is maintained and determines that "random selection is possible" (S14).

On the other hand, when the relative distance RD with respect to the other object is smaller than the threshold Th1 (S12: NO) or when the value obtained by dividing the relative distance RD with respect to the other object by the relative velocity RV is lower than the threshold Th2 (S13: NO), the safety model execution determination unit 1121 determines that "random selection is impossible" (S15).

The evaluation model determination unit 1122 refers to the determination results (S14 and S15) of the safety model execution determination unit 1121 to determine whether one of the prediction models estimated to be safe in the current travel environment can be randomly selected (S16).

When the evaluation model determination unit 1122 determines that the random selection is possible (S16: YES), one prediction model is randomly selected from among the respective prediction models registered as the safety models for every travel environment in the safety model storage unit 116 (S17).

When it is determined that random selection is impossible (S16: NO), the evaluation model determination unit 1122 selects one prediction model having the highest evaluation value in the current travel environment from among prediction model evaluation values for each travel environment stored in the prediction model evaluation value storage unit 115 (S18).

The behavior prediction unit 113 predicts the future behavior of the other object (moving body) using the prediction model determined by the prediction model determination unit 112 (S19). The operation of the subject vehicle 1 is controlled according to the behavior prediction (not illustrated). The prediction model evaluation unit 114 analyzes a result according to the behavior prediction to calculate the evaluation value of the prediction model used for behavior prediction, and updates a storage content of the prediction model evaluation value storage unit 115 (S20).

According to the present embodiment configured in this manner, it is possible to predict the behavior of the moving body using the prediction model corresponding to the travel environment.

According to the present embodiment, the evaluation value of the travel environment-specific prediction model evaluation value storage unit 115 can be updated as needed during the travel of the subject vehicle 1, and thus, it is possible to obtain the appropriate prediction model for each travel environment during the travel.

According to the present embodiment, one prediction model to be used in the behavior prediction unit 113 can be determined from the safety model storage unit 116 to evaluate the prediction model safely during the actual travel, and it is possible to select the appropriate prediction model for each travel environment.

According to the present embodiment, the prediction model that is estimated to be safe for each travel environment is registered in advance, and thus, it is possible to suppress the possibility that the prediction model inappropriate for the current travel environment is selected and to improve the safety and reliability.

According to the present embodiment, one of the prediction models estimated to be safe is selected and used when the predetermined safe state is maintained, and the prediction model having the highest evaluation value in the current travel environment is selected when the predetermined safe state is not maintained. As a result, the prediction model suitable for the current travel environment can always be selected, and the reliability of the moving body behavior prediction device 10 can be improved, in the present embodiment.

Second Embodiment

A second embodiment will be described with reference to FIGS. 10 and 11. Incidentally, differences from the first embodiment will be mainly described in each of the following embodiments including the present embodiment. In the present embodiment, an example in which a prediction model (safety model) estimated to be safe for each travel environment is evaluated and updated will be described.

Figure 10:
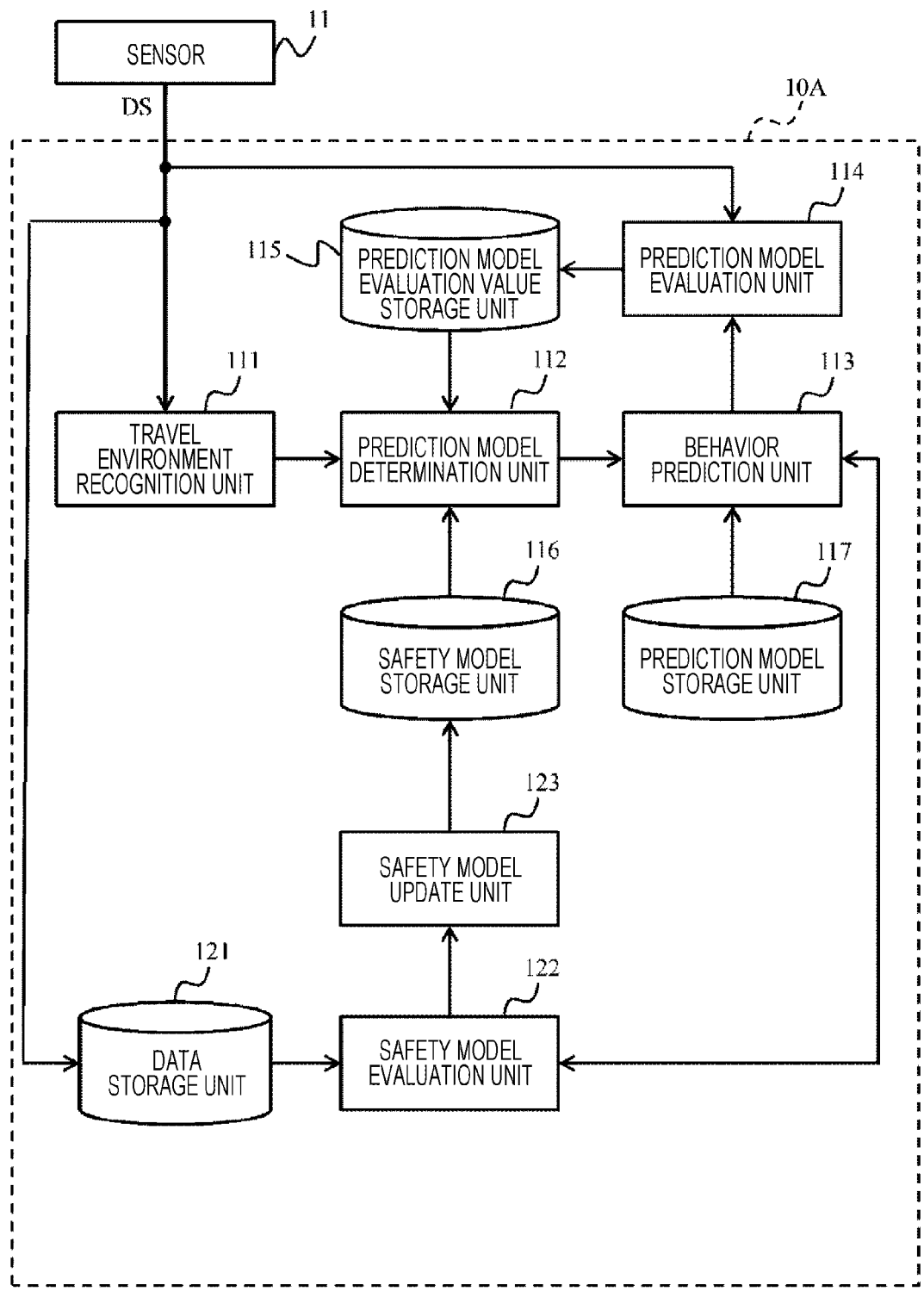
FIG. 10 is a block diagram of a moving body behavior prediction device according to a second embodiment.

FIG. 10 is a block diagram of a moving body behavior prediction device 10A according to the present embodiment. The moving body behavior prediction device 10A further includes a data storage unit 121, a safety model evaluation unit 122, and a safety model update unit 123 in addition to the configurations 111 to 117 described in FIG. 1.

The data storage unit 121 stores past sensor data DS. The safety model evaluation unit 122 reads the past sensor data DS stored in the data storage unit 121 and causes the behavior prediction unit 113 to predict a behavior of a moving body using each prediction model.

The safety model evaluation unit 122 collates a prediction result of the behavior prediction unit 113 with the past sensor data DS to determine whether an operation of controlling the subject vehicle 1 using each prediction model has succeeded or failed similarly to the prediction model evaluation unit 114. The safety model evaluation unit 122 evaluates safety of each prediction model for each travel environment, and acquires the number of operation successes and the number of operation failures as safety model evaluation values.

An overview of a safety model evaluation value 1210 obtained by the safety model evaluation unit 122 will be described with reference to FIG. 11.

The safety model evaluation value 1210 stores the number of operation successes and the number of operation failures when each prediction model is used for each travel environment. Hereinafter, the number of operation successes and the number of operation failures will be sometimes referred to as the number of successes and the number of failures. The safety model evaluation value 1210 associates a travel environment 1211 with each prediction model, and stores the number of successes and the number of failures of each prediction model for each travel environment.

In FIG. 11, for example, "30/70" of the prediction model PM1 in the travel environment DE1 indicates that the number of operation successes is 30 and the number of operation failures is 70. The safety model evaluation unit 122 acquires the safety model evaluation value 1210 of each prediction model for each travel environment. The safety model update unit 123 updates the safety model storage unit 116 based on the safety model evaluation value 1210 generated by the safety model evaluation unit 122.

For example, the safety model update unit 123 determines a prediction model having a success rate equal to or higher than a certain value in the safety model evaluation value 1210 as a safety model that can be selected by the prediction model determination unit 112, and updates the safety model storage unit 116. On the other hand, the safety model update unit 123 determines a prediction model having a success rate lower than the certain value in the safety model evaluation value 1210 as a non-safety model that is not selectable by the prediction model determination unit 112, and updates the safety model storage unit 116.

Although FIG. 10 describes the case where the functions 111 to 117 and 121 to 123 constituting the moving body behavior prediction device 10A are provided in the subject vehicle 1, a mounting location of each of these functions does not matter. All the functions may be mounted on the subject vehicle 1 or at least some of the functions may be mounted on a data center connected to the subject vehicle 1 so as to allow two-way communication.

In the data center, for example, the travel environment-specific prediction model evaluation value storage unit 115, the safety model storage unit 116, and the prediction model storage unit 117 of each vehicle may be managed. In this case, the prediction model evaluation value stored in the travel environment-specific prediction model evaluation value storage unit 115, the safety model for each travel environment stored in the safety model storage unit 116, the calculation procedure and parameters of each prediction model stored in the prediction model storage unit 117 are communicated between one or more vehicles and the data center to be shared by the respective vehicles. An example in which a plurality of vehicles 1 cooperate with an external information processing system will be described later with reference to FIGS. 12 and 13.

The present embodiment configured in this manner also achieves the same operational effects as the first embodiment. Furthermore, it is possible to calculate the safety of the prediction model that is predicted to be safe for each travel environment using the past sensor data DS, that is, past driving data according to the present embodiment, and thus, the reliability of the safety model can be maintained high.

Third Embodiment

A third embodiment will be described with reference to FIGS. 12 and 13. In the present embodiment, the prediction model management server 7 collects prediction model evaluation values for each travel environment from moving body behavior prediction devices 10B of vehicles 1(1) to 1(n), generates a reference evaluation value for each travel environment, and distributes the generated reference evaluation value to the respective moving body behavior prediction devices 10B.

Figure 12:
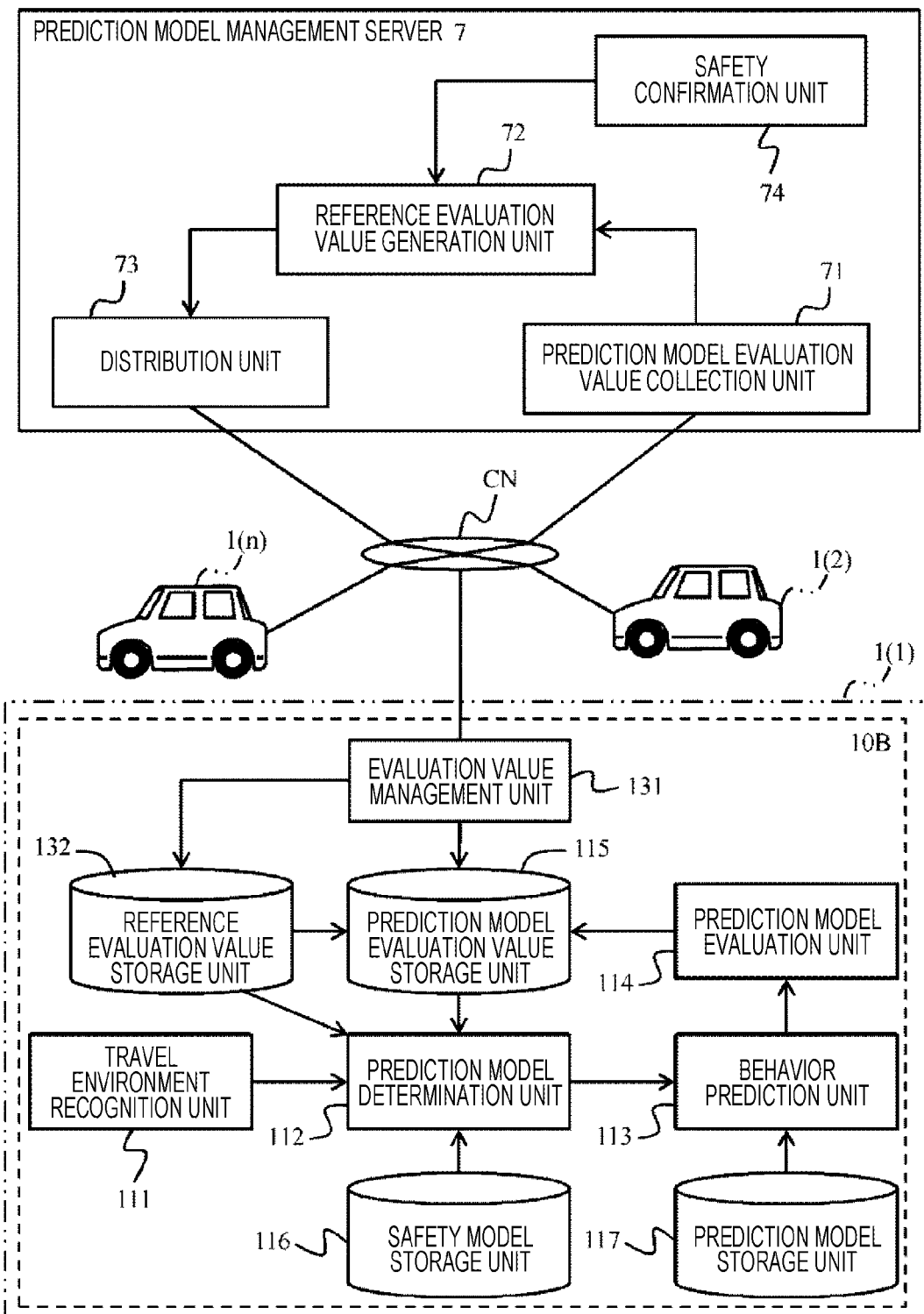
FIG. 12 is a block diagram of an entire system including a moving body behavior prediction device according to a third embodiment.

FIG. 12 is a block diagram of an entire system including the moving body behavior prediction device. Each of the plurality of vehicles 1(1) to 1(n) is equipped with the moving body behavior prediction device 10B, and each of the moving body behavior prediction devices 10B is connected to the prediction model management server 7 via a communication network CN so as to be capable of two-way communication. The moving body behavior prediction device 10B further includes an evaluation value management unit 131 and a reference evaluation value storage unit 132 in addition to the same functions 111 to 117 as the moving body behavior prediction device 10 described in FIG. 1.

The evaluation value management unit 131 manages an evaluation value of a prediction model for each travel environment. The evaluation value management unit 131 transmits the evaluation value stored in the prediction model evaluation value storage unit 115 to the management server 7 via the communication network CN. Then, the evaluation value management unit 131 stores a reference evaluation value received from the management server 7 in the reference evaluation value storage unit 132. The evaluation value management unit 131 updates all or some of the evaluation values stored in the prediction model evaluation value storage unit 115 with the reference evaluation values stored in the reference evaluation value storage unit 132.

Thereafter, the prediction model evaluation unit 114 updates the evaluation value in the prediction model evaluation value storage unit 115 which is a copy of the reference evaluation value storage unit 132. As time passes (travel is repeated), a content of the reference evaluation value storage unit 132 and a content of the prediction model evaluation value storage unit 115 differ from each other. Further, contents of the prediction model evaluation value storage unit 115 immediately after the distribution of the reference evaluation value are substantially the same among the respective vehicles 1(1) to 1(n), but a difference increases as time passes (travel is repeated).

The prediction model management server 7 serving as the "management server" is configured, for example, as a data center, and manages the moving body behavior prediction devices 10B of the plurality of vehicles 1(1) to 1(n). The management server 7 includes, for example, a prediction model evaluation value collection unit 71, a reference evaluation value generation unit 72, a distribution unit 73, and a safety confirmation unit 74.

The prediction model evaluation value collection unit collects all or some of stored contents of the prediction model evaluation value storage units 115 from the evaluation value management units 131 of the respective moving body behavior prediction devices 10B. The same evaluation value as that in the previous collection is not necessarily transmitted from the moving body behavior prediction device 10B to the management server 7, and only the evaluation value that has changed from that in the previous collection may be transmitted to the management server 7.

The management server 7 may request the moving body behavior prediction device 10B to transmit the evaluation value, or the evaluation value may be transmitted from each of the moving body behavior prediction devices 10B to the management server 7 at a predetermined timing.

The reference evaluation value generation unit 72 performs statistical processing on prediction model evaluation values for each travel environment collected from the respective moving body behavior prediction devices 10B to generate a reference evaluation value for each travel environment. Examples of the statistical processing can include processing which totals the respective evaluation values collected from the respective moving body behavior prediction devices 10B for each travel environment and each prediction model. As a result, the reference evaluation value generation unit 72 can generate the reference evaluation values based on information on the travel environments experienced by the respective vehicles 1(1) to 1(n) (evaluation value of each prediction model for the travel environment).

The distribution unit 73 distributes the generated reference evaluation values to the moving body behavior prediction devices 10B of the respective vehicles 1(1) to 1(n) via the communication network CN.

Incidentally, the safety of the reference evaluation value generated by the reference evaluation value generation unit 72 may be confirmed by the safety confirmation unit 74. The safety confirmation unit 74 estimates whether each prediction model can be used in each travel environment. The distribution to the moving body behavior prediction device 10B from the management server 7 can be stopped for the evaluation value not having the safety equal to or higher than a predetermined value.

Figure 13:
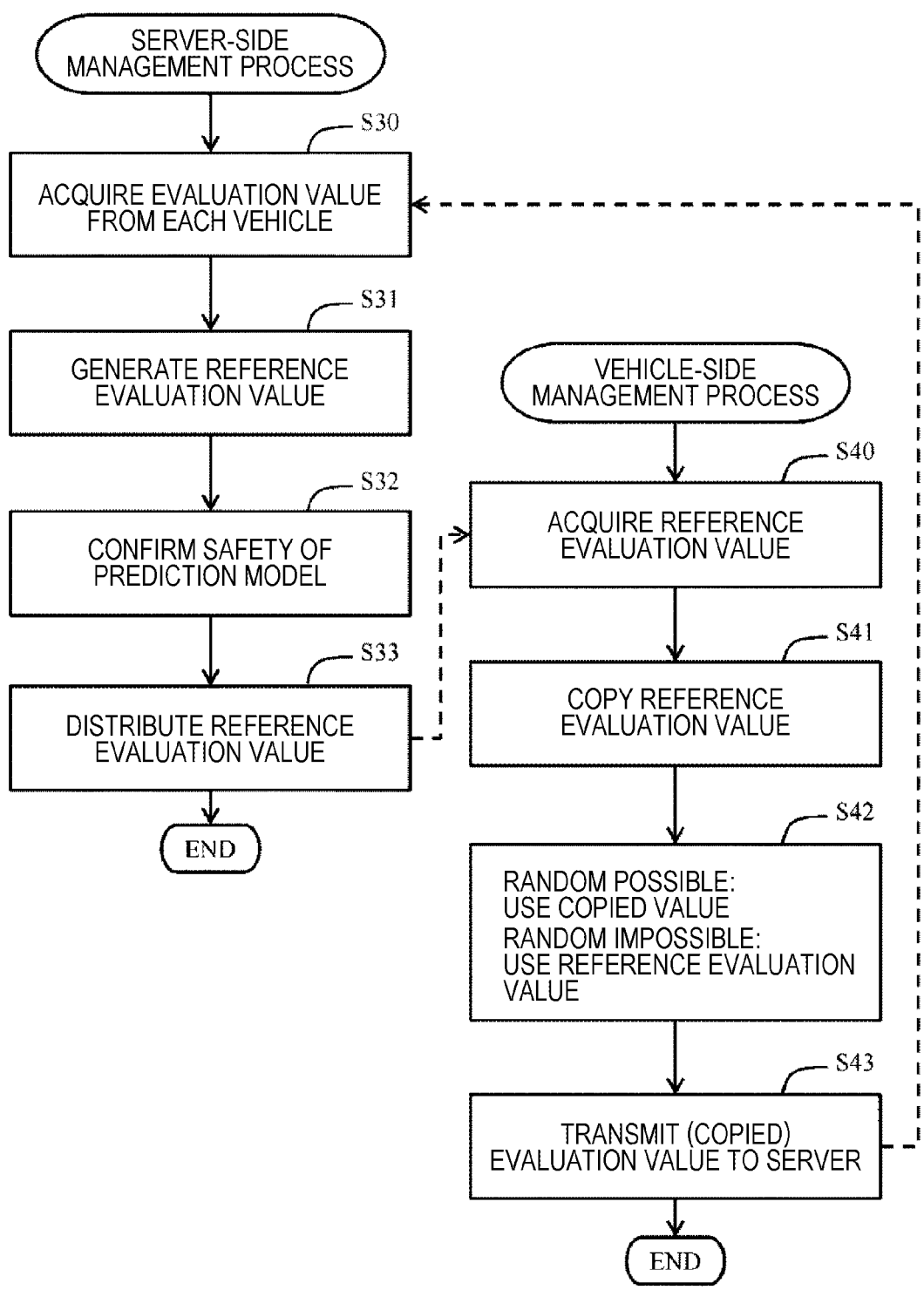
FIG. 13 is a flowchart illustrating how a server manages an evaluation value for each travel environment in relation to each prediction model.

FIG. 13 is a flowchart illustrating an overall operation according to the present embodiment. The prediction model evaluation value collection unit 71 of the management server 7 acquires the content each of the prediction model evaluation value storage units 115 from each of the moving body behavior prediction devices 10B of the vehicles 1(1) to 1(n) via the communication network CN (S30).

The reference evaluation value generation unit 72 of the management server 7 generates the reference evaluation value that needs to be used as the reference in the respective vehicles 1(1) to 1(n) based on the evaluation values of the respective prediction models for each travel environment collected from the respective vehicle 1(1) to 1(n) (S31).

The safety confirmation unit 74 of the management server 7 confirms the safety for each travel environment based on the generated reference evaluation value (S32). The distribution unit 73 of the management server 7 distributes the reference evaluation value whose safety has been confirmed to each of the moving body behavior prediction devices 10B of the vehicles 1(1) to 1(n) via the communication network CN (S33).

When acquiring the reference evaluation value from the management server 7 (S40), the evaluation value management unit 131 of the moving body behavior prediction device 10B updates the content of the prediction model evaluation value storage unit 115 with the reference evaluation value (S41). That is, a copy of the acquired reference evaluation value is created in the prediction model evaluation value storage unit 115. The original data of the reference evaluation value is stored in the reference evaluation value storage unit 132.

When it is possible to randomly select a prediction model during the processing described in FIG. 9, the prediction model determination unit 112 of the moving body behavior prediction device 10B can use the evaluation value of the prediction model evaluation value storage unit 115 and the stored content of the safety model storage unit 116 to randomly select one from the safe prediction models (S17 and S42). At this time, the evaluation value stored in the prediction model evaluation value storage unit 115 is updated according to an evaluation result of the prediction model evaluation unit 114.

On the other hand, when it is difficult to randomly select a prediction model, the prediction model determination unit 112 selects one prediction model having the highest evaluation value in a current travel environment, from among the reference evaluation values stored in the reference evaluation value storage unit 132 (S18 and S42). At this time, the reference evaluation value stored in the reference evaluation value storage unit 132 is not updated according to the evaluation result of the prediction model evaluation unit 114, but the reference evaluation value acquired from the management server 7 is retained. Further, an evaluation value of the prediction model evaluation value storage unit 115 corresponding to a model selected from the reference evaluation value storage unit 132 may be updated according to the evaluation result of the prediction model evaluation unit 114.

Thereafter, the evaluation value management unit 131 transmits the content of the prediction model evaluation value storage unit 115 updated as needed by the prediction model evaluation unit 114 to the management server 7 via the communication network CN at a predetermined timing (S43). Examples of the predetermined timing can include a timing requested from the management server 7, a time zone in which the degree of congestion of the communication network CN is low, a time zone in which the communication network CN is stable, and the like.

The present embodiment configured in this manner also achieves the same operational effects as the first embodiment. Furthermore, the management server 7 collects the evaluation values of the respective prediction models for the respective travel environments experienced by the respective vehicles 1(1) to 1(n) to generate and distribute the reference evaluation value that needs to be used as the reference in the respective vehicles 1(1) to 1(n) in the present embodiment. As a result, the travel environment rarely experienced by each of the vehicles 1(1) to 1(n) can be shared via the management server 7 so that a safer prediction model can be selected in the present embodiment.

For example, types of travel environments that the single vehicle 1 can experience are limited, and the comprehensive is low. On the other hand, the information (prediction model evaluation value) on the travel environments experienced by the respective vehicles 1(1) to 1(n) can be shared through the management server 7 in the present embodiment, and thus, it is possible to select the prediction model suitable for the travel environment even when a vehicle travels under the travel environment that the vehicle rarely encounters. Therefore, it is possible to realize the safe automatic driving.

Incidentally, the invention is not limited to the above-described embodiments and includes various modifications. The above-described embodiments have been described in detail in order to describe the invention in an easily understandable manner, and are not necessarily limited to those including the entire configuration that has been described above. Further, some configurations of a certain embodiment can be substituted by configurations of another embodiment, and further, a configuration of another embodiment can be also added to a configuration of a certain embodiment. Further, addition, deletion, or substitution of other configurations can be made with respect to some configurations of each embodiment.

REFERENCE SIGNS LIST 1 subject vehicle
2 other vehicle
7 prediction model management server
10, 10A, 10B moving body behavior prediction device
11 sensor
71 prediction model evaluation value collection unit
72 reference evaluation value generation unit
73 distribution unit
111 travel environment recognition unit
112 prediction model determination unit
113 behavior prediction unit
114 prediction model evaluation unit
115 travel environment-specific prediction model evaluation value storage unit
116 safety model storage unit
117 prediction model storage unit
121 data storage unit
122 safety model evaluation unit
123 safety model update unit
131 evaluation value management unit
132 reference evaluation value storage unit

The invention claimed is:

1. A moving body behavior prediction device that predicts a behavior of a moving body, the moving body behavior prediction device comprising:
a prediction model evaluation value storage that stores an evaluation value for each travel environment in relation to each of prediction models prepared in advance; and
at least one controller configured to
acquire external information and recognize a travel environment;
determine the prediction model corresponding to the travel environment recognized from among the prediction models, the determination being performed based on the travel environment recognized and the evaluation value stored in the prediction model evaluation value storage;
predict the behavior of the moving body using the prediction model determined; and
a safety model storage that stores at least one or more prediction models estimated to be safe for each of travel environments as safety models,
wherein the at least one controller is configured to:
determine one prediction model corresponding to the travel environment based on the evaluation value stored in the prediction model evaluation value storage according to a predetermined condition set in advance, or select one prediction model corresponding to the travel environment from among the prediction models stored as the safety models in the safety model storage, wherein
the predetermined condition is a case where it is possible to estimate that a predetermined safe state is maintained,
the at least one controller is configured to, when it is possible to estimate that the predetermined safe state is maintained, determine one prediction model corresponding to the travel environment, from among the prediction models stored as the safety models in the safety model storage, and
the at least one controller is configured to, when it is difficult to estimate that the predetermined safe state is maintained, select one prediction model having a highest evaluation value stored in the prediction model evaluation value storage from among prediction models corresponding to the travel environment,
the at least one controller is configured to, when it is possible to estimate that the predetermined safe state is maintained, randomly determine one prediction model corresponding to the travel environment from among the prediction models stored as the safety models in the safety model storage, and
the at least one controller is configured to control the behavior of the moving body based at least in part on the predicted behavior of the moving body.

2. The moving body behavior prediction device according to claim 1,
wherein the at least one controller is configured to:
evaluate the evaluation value for each travel environment stored in the prediction model evaluation value storage, and
update the evaluation value stored in the prediction model evaluation value storage according to a prediction result of the at least one controller.

3. The moving body behavior prediction device according to claim 2, wherein the at least one controller is configured to:
manage the evaluation value stored in the prediction model evaluation value storage,
transmit the evaluation value for each travel environment in relation to each of the prediction models stored in the prediction model evaluation value storage to a management server, and
update the evaluation value stored in the prediction model evaluation value storage with an evaluation value received from the management server.

4. The moving body behavior prediction device according to claim 3, further comprising:
 a reference evaluation value storage that stores the evaluation value received by the at least one controller from the management server as a reference evaluation value; and
 a safety model storage that stores at least one or more prediction models estimated to be safe for each of travel environments as safety models,
 wherein the at least one controller is configured to, when it is possible to estimate that a predetermined safe state is maintained, determine one prediction model corresponding to the travel environment, from among the prediction models stored as the safety models in the safety model storage, and when it is difficult to estimate that the predetermined safe state is maintained, select one prediction model having a highest reference evaluation value among prediction models corresponding to the travel environment.

5. The moving body behavior prediction device according to claim 2, wherein
 the at least one controller is configured to update an evaluation value of the prediction model so as to lower the evaluation value when a predetermined situation set in advance occurs and to raise the evaluation value when the predetermined situation does not occur in accordance with the prediction result.

6. The moving body behavior prediction device according to claim 1, wherein the at least one controller is configured to:
 evaluate whether the prediction model stored as the safety model in the safety model storage is safe,
 calculate a behavior in a case of inputting past external information to each of the prediction models, and
 evaluate whether each of the prediction models is safe based on a result of the calculation.

* * * * *